May 19, 1964 R. L. FRANKLIN 3,133,479
PNEUMATIC DE-BLOCKER
Filed June 7, 1962
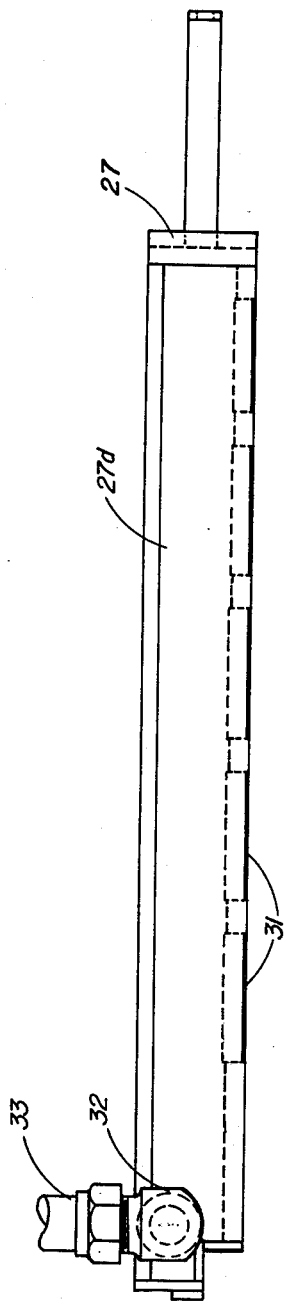
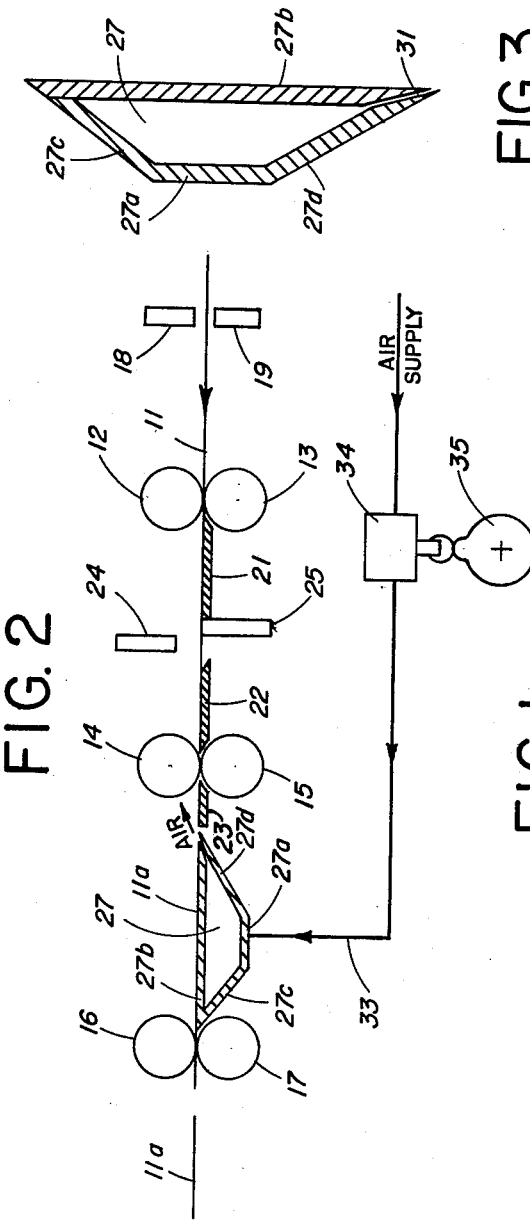
R. L. FRANKLIN
INVENTOR.
BY E. J. Berry

United States Patent Office 3,133,479
Patented May 19, 1964

3,133,479
PNEUMATIC DE-BLOCKER
Robert L. Franklin, Rochester, N.Y., assignor to National Distillers and Chemical Corporation, New York, N.Y., a corporation of Virginia
Filed June 7, 1962, Ser. No. 200,884
5 Claims. (Cl. 93—8)

The present invention relates to a means for relieving adhesion between the cut edges of a bag unit formed from a traveling web of bag stock comprising superposed layers of a thermoplastic material such as polyethylene, polypropylene, and similar materials. More particularly, the invention relates to such means in combination with apparatus for forming individual bag units from a traveling web wherein the superposed layers of materials are united by fusion, under heat and pressure, along narrowly defined areas transversely of the web, at spaced intervals which correspond substantially to the desired bag depth, after which the units are separated from the web by cutting along the leading edge of a fused area.

In a conventional bag forming operation, using thermoplastic materials of the nature contemplated, the bag stock is formed either by tubular extrusion or by edge sealed juncture of two superposed sheets of such material. The stock, as formed, is supplied to the bag forming apparatus, either directly from the extrusion and/or edge sealing means or from previously wound rolls of the formed bag stock. As supplied to the bag forming apparatus, the stock is first subjected to heat and pressure along narrowly defined linear areas transversely of the web of layered material, whereby to fuse one layer to the other. In this operation, the fused areas are spaced longitudinally of the web by a dimension substantially equal to the desired depth or length of the bag to be produced. As the web advances, it is then cut transversely along a line immediately adjacent to a transverse fused area at the leading edge thereof, in the direction of travel of the web.

In such an operation, especially when the web layers are thin, as for example in the range of from about 0.5 to about 2.0 mils, the cutter knives, or elements, tend to produce adhesion of the layers along the cut edges. This is undesirable, as each pair of cut edges forms the "open" end of a bag unit, and if these edges are "blocked," manual or machine filling of the bag unit is likely to be impeded.

It is an object of the present invention to provide a means whereby blocking of the bag unit "open end" is relieved. It is also an object of the invention to provide such means for inclusion in combination with a conventional system for forming the bag units from a substantially continuous web of bag stock.

The invention and its objects may be more clearly understood from the following description, when it is read with reference to the accompanying drawing, wherein FIG. 1 is a diagrammatic showing of a bag production system, providing a side elevational view in which the deblocking means is shown in vertical section;

FIG. 2 is a plan view of the deblocking means; and

FIG. 3 is a view in enlarged vertical section through the de-blocking means as shown in FIGS. 1 and 2.

In the drawings, like parts are designated by the same numerals throughout. Accordingly, in the drawings, the numeral 11 designates a layered web of a thermoplastic material, advanced in a substantially continuous fashion from a source not shown. The web is advanced along its travel path by means such as the nip rolls 12 and 13. Individual bag units 11a are discharged from the system as by means of the nip rolls 14 and 15, and 16 and 17.

Immediately prior to engagement by the nip rolls 12 and 13, the web layers are joined in a linear area transversely of the web and at intervals spaced by approximately the depth of the bag unit to be formed. In the apparatus shown and exemplifying the contemplated system, this is accomplished by means of a pair of heated platens such as designated by the numerals 18 and 19. One or both platens may be heated and reciprocally movable toward and away from the web. The fusion and sealing means contemplated may be any one of many conventional means available in the art, and its nature and specific characteristics do not form an essential part of the present invention. In fact, the web supplied to the contemplated operation may be derived from a mill roll wherein the transverse seals or fusion areas have been impressed by an earlier and separate operation.

In the production line digrammatically represented by FIG. 1, the web 11 passes between the nip rolls 12 and 13 and over a table surface such as provided by elements designated in FIG. 1 by the numerals 21, 22, and 23. These surfaces may be provided by solid elements having a ridged upper surface wherein the ridges extend in the direction of web travel or by a lateral series of bar elements spaced laterally one from another. Here also, the form and nature of the table surface provided are typical in the prior art.

At the terminal edge of the element 21 is a fixed cutter knife 25. Above it and above the web path is a reciprocally movable cutter knife 24. These knives are adapted for engagement in a relationship such as or similar to the blades of a scissors or guillotine cutter. They are disposed at a distance from the line of tangential contact between the nip rolls 14 and 15 which is somewhat less than required for the web to be engaged by these rolls prior to actuation of the knives 24 and 25. Their operation is adjusted and regulated so as to cut the web along a line substantially corresponding to the leading edge of each transverse fused area of the web, whereby the open end of the each bag unit thus formed is the trailing end as the unit progresses through the system.

In order to provide tautness in the web as it is brought into cutting position and also to produce a degree of separation between bag units as they move onward beyond the knives 24 and 25, the rotative speed of the nip rolls 14 and 15 as well as 16 and 17, exceeds that of the nip rolls 12 and 13. A typical speed differential would be such as to produce about a two-inch spacing between the open end of one bag unit and the fused end of the next unit beyond the line of tangency between the rolls 14 and 15.

Featured in the apparatus illustrated by FIG. 1 is a deblocking manifold 27, including top, bottom, and lead in and trailing side wall portions respectively designated by the numerals 27a, 27b, 27c, and 27d. This manifold is shaped to permit entry of the trailing edge, formed between the top 27a and the side 27d, into the angle between the rolls 16 and 17 and to facilitate air flow over the surface of the side portion 27c toward the leading edge, formed between the top 27a and the side portion 27c. A suitable cross-sectional form to accomplish these objects is that of a trapezoid, as shown in FIGS. 1 and 3. The manifold, illustrated by FIGS. 1, 2, and 3, is a hollow, elongated element of relatively narrow width. It is adapted to be disposed laterally of the film web travel path, with its longitudinal dimension at right angles to the direction of web travel, sequentially following the table element 23, and with the manifold leading edge spaced from the table element trailing edge by a distance sufficient freely to suspend the cut edge of each bag unit formed, between the elements 23 and 27, as the bag unit is drawn over the upper surface 27a of the element 27. The spacing, however, is adjusted or limited by a distance less than that which would permit the web material to sag as each bag unit passes over the open space. In a typical installation adapted to handle the thinner web material stock, the spacing contemplated would be in the range of from about 1/16 inch to about 1/8 inch.

Also as shown, in the manifold trailing edge, formed at the juncture between the portions 27b and 27d, are a series of elongated, narrowly defined ports 31. These ports are disposed and arranged so as to provide for the discharge of a plurality of air streams outwardly from the base surface 27b, generally in contra relation to the direction of travel of the web 11 and at an angle to said path in the range of from about 10° to about 20° relative thereto. In a preferred embodiment and procedure, these air streams will be discharged at an angle of about 15° relative to the web travel path.

In the view provided by FIG. 2, an elbow 32 is shown to be secured to the manifold upper surface or base portion 27b. This elbow is provided for communication with the interior of the manifold and with an air supply conduit 33, adapted to conduct a stream of pressurized air into the manifold from a conventional source not shown. In FIG. 1, this supply conduit 33 is represented diagrammatically and is shown as including a control valve 34.

The control valve 34 is a cam and spring actuated check or shut off valve. It is intended to prevent the flow of pressurized air through the conduit 33, except when unseated, as by means such as the cam plate or sleeve 35.

The plate 35 is provided for rotation in a timed sequence synchronized with the rate of travel of the bag units between the nip rolls 14 and 15 and nip rolls 16 and 17, whereby to discharge air from the ports 31 as about the last three quarters of an inch of the bag unit passes over the trailing edge of the manifold base surface 27b. Depending on the gauge and speed of the web material, this distance may be varied in the range of from about 1/2 inch to about 1 1/4 inches, a longer period being allowed for air discharge from the ports 31 when working with heavy gauge materials than with those of lighter gauge.

In operation according to the method contemplated, a completed bag unit, after separation from the web, is discharged at slightly accelerated rate, whereby to space the trailing edge of one unit from the leading edge of the next. The thus separated unit is passed over a surface substantially common to its travel path, and while the sealed leading edge or bag portions are restrained, the cut trailing edge is vibrated by means of an air jet directed angularly against the trailing edge over substantially the entire width of the bag unit and for a restricted terminal portion of its length, whereby to de-block or to relieve incidental adhesion between the cut edges of opposite wall portions laterally of the bag unit.

What is claimed is:

1. In a method for forming individual bag units wherein a layered web of bag stock, integrally joined along its longitudinal edges, is passed in substantially continuous fashion along a planar travel path and respectively fused along lines laterally of said web and at spaced intervals longitudinally thereof, and then cut into separate units at the leading edge of each line of fusion, the improvement which comprises restraining each said unit substantially in the area of said fused lines and directing high velocity air streams angularly against said bag unit in a limited terminal area laterally of said unit and adjacent the cut end thereof and vibrating said end under the action of said air streams, whereby positively to relieve the tendency for said web layers to adhere in the area adjacent said cut end.

2. A method according to claim 1, wherein said air streams are directed toward the travel path of said web from below said path.

3. A method according to claim 1, wherein said air streams are directed toward the travel path of said web and in a direction generally opposed to the direction of movement of said web along said path.

4. In an apparatus for forming individual bag units from a substantially continuous web of a thermoplastic material moving through an extended travel path and composed of superposed layers of such material integrally joined along their longitudinal edge portions, and transversely along narrowly defined fused areas transversely of said web and spaced longitudinally thereof, including cutter knives disposed transversely of said travel path, and adapted sequentially to cut said web transversely along a line substantially corresponding to the leading edge of each narrowly defined transverse fused area, means comprising a table member disposed transversely of said travel path in a plane substantially common thereto, and subsequent to said cutter knives; nip roll means subsequent to said table member, adapted to engage and restrain said bag unit substantially in an area adjacent said transversely fused area thereof and a narrowly defined air jet disposed and directed to discharge a pressurized stream of air angularly against a narrowly defined area transversely of said bag unit and adjacent the cut edges of each bag unit.

5. An apparatus according to claim 4, wherein said table member comprises a manifold, conduit means including a valve for supplying pressurized air to said manifold intermittently, and a series of narrowly defined elongated discharge ports opening from said manifold in angular relation to the plane of said travel path and contra to the direction of movement of said web in said path.

References Cited in the file of this patent

UNITED STATES PATENTS

| | | |
|---|---|---|
| 1,610,965 | Ranney et al. | Dec. 14, 1926 |
| 2,737,859 | Allison et al. | Mar. 13, 1956 |
| 2,745,583 | Harker | May 15, 1956 |
| 2,851,838 | McIntyre et al. | Sept. 16, 1958 |
| 2,855,831 | Nunzio et al. | Oct. 14, 1958 |